United States Patent
Boucadair et al.

(10) Patent No.: US 10,356,013 B2
(45) Date of Patent: Jul. 16, 2019

(54) METHOD OF EMULATING A MULTIPATH CONNECTION

(71) Applicant: Orange, Paris (FR)

(72) Inventors: Mohamed Boucadair, Betton (FR); Christian Jacquenet, Pont-Pean (FR)

(73) Assignee: ORANGE, Paris (FR)

( * ) Notice: Subject to any disclaimer, the term of this patent is extended or adjusted under 35 U.S.C. 154(b) by 79 days.

(21) Appl. No.: 15/567,265

(22) PCT Filed: Apr. 15, 2016

(86) PCT No.: PCT/FR2016/050886
§ 371 (c)(1),
(2) Date: Oct. 17, 2017

(87) PCT Pub. No.: WO2016/166493
PCT Pub. Date: Oct. 20, 2016

(65) Prior Publication Data
US 2018/0109473 A1   Apr. 19, 2018

(30) Foreign Application Priority Data

Apr. 17, 2015  (FR) ..................... 15 53464

(51) Int. Cl.
*H04L 12/713* (2013.01)
*H04L 12/931* (2013.01)
(Continued)

(52) U.S. Cl.
CPC .............. *H04L 49/70* (2013.01); *H04L 45/24* (2013.01); *H04L 45/586* (2013.01); *H04L 45/64* (2013.01); *H04L 45/70* (2013.01)

(58) Field of Classification Search
CPC ....... H04L 49/70; H04L 45/70; H04L 45/586; H04L 45/64; H04L 45/24
See application file for complete search history.

(56) References Cited

U.S. PATENT DOCUMENTS

| 2006/0256729 A1* | 11/2006 | Chen ................... H04L 63/1408 370/250 |
| 2011/0188387 A1* | 8/2011 | Das ........................ H04L 43/00 370/252 |

FOREIGN PATENT DOCUMENTS

| EP | 2538637 A2 | 12/2012 |
| EP | 2763362 A1 | 8/2014 |

(Continued)

OTHER PUBLICATIONS

International Search Report dated Jun. 30, 2016, for corresponding International Application No. PCT/FR2016/050886, filed Apr. 15, 2016.

(Continued)

*Primary Examiner* — Jay P Patel
(74) *Attorney, Agent, or Firm* — David D. Brush; Westman, Champlin & Koehler, P.A.

(57) ABSTRACT

A method of emulating a multipath connection, in which data packets sent or received by a given user equipment are intercepted by a plurality of concentrators situated in at least one network to which the user equipment is connected. Each concentrator serves to aggregate connections making use of a plurality of paths that can be used by the user equipment. One of the concentrators is designated in dynamic manner as being "primary" concentrator, and the other concentrator(s) are designated as being "secondary" concentrator(s). The primary concentrator or a secondary concentrator: a) receives a data packet sent by the user equipment to a correspondent; b) when necessary, removes all of the multipath options from the received packet; c) replaces the source address of the received packet with an address of the primary concentrator; and d) sends the packet as modified in this way to the correspondent.

13 Claims, 8 Drawing Sheets

(51) Int. Cl.
*H04L 12/707* (2013.01)
*H04L 12/715* (2013.01)
*H04L 12/721* (2013.01)

(56) References Cited

FOREIGN PATENT DOCUMENTS

| WO | 2011127189 A2 | 10/2011 |
|---|---|---|
| WO | 2014068062 A1 | 5/2014 |

OTHER PUBLICATIONS

English translation of the International Written Opinion dated Jun. 30, 2016, for corresponding International Application No. PCT/FR2016/050886, filed Apr. 15, 2016.
Hartman et al., "Extensible Authentication Protocol (EAP) Mutual Cryptographic Binding", RFC 7029, Oct. 2013.
M. Scharf et al., "Multipath TCP (MPTCP) Application Interface Considerations", RFC 6897, Mar. 2013.
Ford et al., "TCP Extensions for Multipath Operation with Multiple Addresses", RFC 6824, Jan. 2013.
P. Funk et al., "Extensible Authentication Protocol Tunneled Transport Layer Security Authenticated Protocol Version 0 (EAP-TTLSv0)", RFC 5281, Aug. 2008.
D. Simon et al., "The EAP-TLS Authentication Protocol", RFC 5216, Mar. 2008.
B. Aboba et al., Extensible Authentication Protocol (EAP), RFC 3748, Jun. 2004.
C. Demichelis et al., "IP Packet Delay Variation Metric for IP Performance Metrics (IPPM)", RFC 3393, Nov. 2002.
A. Gulbrandsen et al., A DNS RR for Specifying the Location of Services (DNS SRV), RFC 2782, Feb. 2000.
Defense Advanced Research Projects Agency, Information Sciences Institute, "Transmission Control Protocol, DARPA Internet Program, Protocol Specification", RFC 793, Sep. 1981.
Defense Advanced Research Projects Agency, Information Sciences Institute, "Internet Protocol, DARPA Internet Program, Protocol Specification", RFC 791, Sep. 1981.

\* cited by examiner

METHOD OF EMULATING A MULTIPATH CONNECTION

CROSS-REFERENCE TO RELATED APPLICATIONS

This Application is a Section 371 National Stage Application of International Application No. PCT/FR2016050886, filed Apr. 15, 2016, the content of which is incorporated herein by reference in its entirety, and published as WO 2016/166493 on Oct. 20, 2016, not in English.

FIELD OF THE DISCLOSURE

The present invention relates to the field of telecommunications, and in particular to communications networks suitable for implementing the Internet protocol (IP). More particularly, the present invention relates to providing "added-value" services in IP networks, i.e. networks capable of performing processing that differs depending on the nature of the data traffic being conveyed in the network.

The invention applies to any type of client device, such as a fixed or mobile terminal, or a residential gateway, or a business gateway, or a network operator gateway, or indeed a set-top box (STB). For reasons of concision, a client device of any type is often referred to below as a "terminal".

BACKGROUND OF THE DISCLOSURE

Terminals, such as smartphones or personal computers (PCs) are nowadays capable of activating and using a plurality of logic interfaces associated with one or more physical interfaces. Such terminals are said to be multi-interface (MIF) terminals.

A plurality of IP addresses can be allocated to such MIF terminals so that they can connect to different types of network such as a fixed network, a mobile network, or a wireless local area network (WLAN), where the emblematic example would be a WiFi network, and in a manner that may be simultaneous or deferred. These IP addresses may:
- belong to the same family of addresses or to different families of addresses (IPv4, IPv6, or both);
- have different lifetimes;
- have different scopes, e.g. a private IPv4 address, a unique IPv6 address of local scope (i.e. a unique local address (ULA)), or an IPv6 address of global scope (global unicast address (GUA)); and
- be allocated to the same logical network interface or to different logical network interfaces.

Nevertheless, it should be observed that the "MIF" characteristic is volatile, since the ability to use a plurality of interfaces depends on conditions of connection to the network(s), on the location of the device, or on other factors. An MIF device may in particular make use of a plurality of interfaces that are available to it while setting up a simple connection (i.e. a connection set up along a single path with a given third party), or after setting up a simple connection. It may also be observed that a device does not know a priori whether it has the possibility of using a plurality of distinct paths for setting up a connection with a given third party. More precisely, the device acquires this information (where appropriate) only at the end of a stage during which it attempts to set up a multipath connection with the third party.

When a terminal has a plurality of interfaces capable of connecting to different access networks (e.g.: fixed, mobile, or WLAN), it then benefits from access that it said to be "hybrid", since it combines different access network technologies. The services on offer concerning a terminal having hybrid access rely on introducing functions in the network that make it possible to aggregate all of the network connections of a terminal (e.g.: WLAN and 3G, or ADSL, WLAN and 4G).

In this respect, it should be recalled that in the field of networks, the term "link aggregation" designates grouping together a plurality of links that are associated with a corresponding number of "logical" interfaces as though they were a single link associated with a single interface, in particular for the purpose of increasing data rates beyond the limits of a single link, but also for applying the same operating procedures to all of the links aggregated in this way (a concept referred to as "fate sharing"). Link aggregation may optionally also ensure that other interfaces take over if a network link should fail (redundancy principle). Link aggregation applies to any type of traffic conveyed over such links, including IP traffic.

Link aggregation could also be used for spreading traffic over a plurality of links. Under such circumstances, the spreading of traffic over the links that make up an aggregate depends on various parameters; the spreading of traffic may depend for example on the type of traffic, such as transmission control protocol (TCP) or user datagram protocol (UDP), or on the traffic engineering policy, such as the required quality of service (QoS).

By way of example, FIG. 1 shows a terminal T connected to a server S via a plurality of IP networks referenced R1, . . . , Rm and O, by implementing the multipath TCP (MPTCP) connection protocol. The various access networks R1, . . . , Rm may be of wired, wireless, or other natures; furthermore, these accesses may be multiple, i.e. the terminal T may have the capacity to connect to different access networks optionally in simultaneous manner.

Likewise, FIG. 1b shows a terminal T compatible with MPTCP or only with TCP, and located behind a piece of equipment referred to as a proxy R; the proxy R is itself connected to a server S via a plurality of IP networks written R1, . . . , Rm, and O, implementing the multipath TCP connection protocol (MPTCP).

In general manner, the term "proxy" is used to designate a piece of equipment located in the network and acting on behalf of one or more user equipment, such as a terminal or a gateway. This configuration enables the user equipment to benefit from optimized use of available network resources, and also to establish multipath connections quickly.

It should be observed that link aggregation makes no assumptions about the configuration of the remote machine. Thus, a source machine may activate a link aggregation function without the remote machine using such a function.

Various modes of aggregation may be envisaged, including the following three modes:
- backup mode: this mode consists in using secondary paths in the event of primary paths being unavailable, with this being for the purpose of improving the availability of the network and thus the robustness and the reliability of IP connections set up over the various links;
- bonding mode: this mode consists in using the resources associated with some or all of the available paths, the IP streams associated with a given application possibly being spread over a plurality of paths; the decision to use all of the paths, or only some of them, may for example be conditioned by the nature of the traffic or the availability or reliability characteristics associated with each path, which characteristics may vary greatly from one path to another; all of the paths selected for this bonding mode are considered as being primary paths; and a "comfort" mode: this mode is similar to the bonding mode, except that the streams of a given application are not spread over a plurality of paths, but are sent over a single path.

It should be observed that these modes are not mutually exclusive, and that they are not specific to any one particular type of traffic. Thus, they may be put into place independently of the nature of the traffic that is to be conveyed along paths aggregated in one or another of the various modes.

Nevertheless, using multiple paths for setting up communications raises problems of various kinds.

It is commonly accepted that the use of load sharing mechanisms between a plurality of paths needs to ensure that those paths possess a comparable level of quality of transfer, in particular so as to avoid weakening the integrity of the data that is characteristic of a given connection and that is exchanged over those various paths (the quality of transfer may be characterized by a plurality of parameters including, in particular: latency, jitter, and/or rate of packet loss).

When a terminal benefits from hybrid access, its actual ability to make use of all of its interfaces is generally associated with the quality of each of the access networks in question, as perceived by the terminal, or by an application that is active in the terminal. This quality may be expressed in terms of available bandwidth, or of time to access the desired resource, or indeed in terms of variation in transmission delay, as specified in Document RFC 3393 of the Internet engineering task force (IETF). This quality naturally varies from one access network to another, and may present considerable disparities that could compromise setting up a multipath communication over the various access networks; the risk of a loss of integrity of the streams exchanged during the communication increases with any increase in such differences, to such an extent that the communication might become unintelligible. Furthermore, this disparity varies over time, e.g. as a function of the level of utilization of the resources of a network. The quality of the aggregated link also depends on the locations and the effectiveness of the network functions that enable of the network connections of a terminal to be aggregated.

These different quality levels can compromise setting up additional subflows in the context of a multipath connection. The magnitude of the above-mentioned risk of loss of integrity might incite the terminal to set up a simple connection only, even though that means losing the benefit characteristics of a multipath connection, such as optimizing available bandwidth resources or preserving continuity of a connection in the event of loss of attachment to a first network and re-attachment to a second network.

Such a risk is also made worse in the context of a terminal that does not have its own means enabling it to set up a multipath connection, and doing this by calling on a proxy such as the device described briefly above. In this context, the question of disparity between the quality levels associated with using a plurality of available proxy-functions (e.g. depending on the location of the remote terminal with which the terminal seeks to set up a communication) becomes correspondingly more complex to solve when the terminal does not necessarily have the information and the intelligence required for selecting the proxy that presents the best guarantees of quality, e.g. depending on the nature of the traffic, of the application, or of the service associated with the communication.

Furthermore, at present, multipath protocols have not yet been adopted in generalized manner by content servers. Thus, some content servers process multiple connections as disjoint connections, and do not have a mechanism enabling them to correlate a plurality of connections in order to associate them with a single terminal, which has the unfortunate consequence of preventing any attempt at setting up a multipath connection, as shown in FIG. 2a.

As shown in FIG. 2b, this problem of a server being incompatible with multipath connections has an impact on the effectiveness of the communications of any terminal seeking to communicate with such a server, whether the terminal is connected directly to the network or via a proxy.

In order to assist terminals, residential gateways (e.g. home or business gateways), set-top boxes, or other user equipments in setting up and maintaining connections via multiple paths, IP connectivity suppliers make use of devices referred to as "network connection concentrators". A "network connection concentrator" designates any network function making it possible to aggregate connections making use of different paths that might be used by a device in order to set up a communication with a remote device.

By way of example, a network connection concentrator (the term "concentrator" on its own is used below for reasons of concision) may be a function in a residential gateway, or it may cohabit with an MPTCP or with a stream control transmission protocol (SCTP) proxy-function, or with a generic routing encapsulating (GRE) tunnel termination point, or indeed may be a termination point of IP-in-IP tunnels or of level 2 tunnels. Where appropriate, the aggregation of all the multiple paths by a concentrator may give rise to one or more virtual tunnels being set up, e.g. in order to facilitate management operations associated with setting up the communication (by isolating the traffic characteristic of the communication set up over the various paths that have been aggregated in this way, and by improving the process for detecting failures).

As examples, FIGS. 3a, 3b, and 3c show various types of architecture associated with network connection concentrators.

These figures show a terminal T connected to one or more IP networks R1, . . . , Rm or O via N nodes $(P_1, P_2, \ldots, P_N)$ having a network connection concentrator function. By way of example, such a node may be a gateway (home or business) or an IP router. In the figures, it can be seen that:

the terminal may be connected to a single network O managed by a single IP connectivity supplier that has deployed at least one network connection concentrator (FIG. 3a); or the terminal may be connected to m networks R1, . . . , Rm, all hosting at least one network connection concentrator (FIG. 3b); or indeed the terminal may be connected to m networks R1, . . . , Rm, some of which host a plurality of network connection concentrators (FIG. 3c).

Advantageously, intervention by a network connection concentrator has the particular effect that a connection that is seen by a local device as being a multipath connection may be seen by a remote device as being a plurality of simple connections, as shown in FIG. 4a.

Nevertheless, even in the presence of one or more concentrators, additional problems arise. In particular, as shown in FIG. 4b, certain connections (e.g. TCP connections) of an aggregate will be rejected by a remote device since it is incapable of correlating the various connections in order to process them as an aggregate connection sent by one and only one user equipment, since the messages reaching the remote device present different source addresses (@IP_1, @IP_2, . . . , @IP_N).

A first approach consists in ensuring that each terminal uses only one address as the source address of the packet that it sends over all of its access networks. However that approach is not a good solution to the above-mentioned problem, since access networks activate mechanisms for verifying source addresses in order to avoid prefixes being pirated and usurped (known as "anti-spoofing" mechanisms). Thus, packets sent with an address other than the address allocated by the access networks are rejected by the access network (since they are taken to be attempts at stealing addresses).

Naturally, that risk of piracy could be minimized or reduced to zero if coordination were put into place between the operators of various access networks, or in the event of the various access networks being managed by the same network connectivity operator. However coordination between various access network operators for allocating a single address and/or a single prefix to a terminal is not realistic. As for the single operator assumption, it is restrictive since, in a conventional deregulation context, terminals have the possibility of using networks that are not managed by the same operator. In addition, ensuring the same addressing policy for all of the access networks operated by a given operator gives rise to considerable engineering, or indeed organizational implications; specifically, the reality of deployment influenced by regulatory constraints, and also by conditions for allocating address blocks, and guided by the desire to ensure deployment flexibility at network segment level (e.g. fixed and mobile), is such that so-called "convergent" operators use different addressing plans for the different access networks that they use.

Another approach consists in deploying one and only one concentrator, with the packets sent via all of the access networks being intercepted by the same concentrator. This approach likewise presents serious drawbacks, as set out below.

A first variant consists in activating routing mechanisms in each access network in order to redirect traffic towards said concentrator. To do this, the access network needs to inspect all of its traffic, which requires complex functions of each packet inspection (DPI) type.

Furthermore, this solution is not appropriate if a load sharing mechanism is activated by the network hosting the concentrator function (e.g. if the allocation of a concentrator to serve a terminal is performed during attachment to the network), since the traffic engineering policies of access networks that do not host the selected concentrator need to be adjusted dynamically in order to take account of constraints in another network, which would be extremely complicated to implement.

A second variant consists in having recourse to an encapsulation mechanism (e.g. GRE or IP-in-IP) in order to force packets to pass via a single concentrator, regardless of the access network used for sending the packet. However encapsulation introduces additional complexity and, as a function of the encapsulation scheme used, that can go so far as to cancel the positive effects of a link aggregation mechanism. Encapsulation is also liable to degrade significantly the switching performance of the equipment terminating the set of GRE or IP-in-IP tunnels and also housing the concentrator function. Furthermore, problems of passing through network address translators (NATs) and firewalls can be encountered when using certain encapsulation mechanisms and when restrictive filtering rules are configured on a NAT or on a firewall placed in one or more multiple paths. Finally, the quality of multipath communications would depend not only on the location of the concentrator, but also on the performance of the various access networks used to reach the concentrator, and the quality of experience (QoE) as perceived by the user of the user equipment would depend on conditions of connection to the various networks.

SUMMARY

In a first aspect, the present invention thus relates to a method of emulating a multipath connection, in which data packets sent or received by a given user equipment are intercepted by a plurality of concentrators situated in at least one network to which said user equipment is connected, each concentrator serving to aggregate connections making use of a plurality of paths that can be used by the user equipment. Said method is remarkable in that one of the concentrators is designated in dynamic manner as being the "primary" concentrator and the other concentrator(s) as being the "secondary" concentrator(s), and in that said primary concentrator or a secondary concentrator:

a) receives a data packet sent by the user equipment to a correspondent;

b) when necessary, removes all of the multipath options from the received packet;

c) replaces the source address of the received packet with an address of the primary concentrator; and d) sends the packet as modified in this way to said correspondent.

By means of these provisions, when a given correspondent of said user equipment receives a set of packets that have been modified in accordance with the invention, said correspondent associates all of those packets with a single simple connection initialized by a user equipment that said correspondent sees as having as its address said address of the primary concentrator, referred to as the "external" address. Thus, the communication can take place successfully, even if the correspondent is not compatible with multipath connections.

When a packet sent by the user equipment is intercepted by a secondary concentrator, the secondary concentrator can send the modified packet to the correspondent, as mentioned briefly above. In a variant, according to particular characteristics, said secondary concentrator may implement the following steps:

inserting into the packet an option mentioning said source address of the packet together with an option mentioning the destination address of the packet;

replacing the source address of the packet with an address of the secondary concentrator;

replacing the destination address of the packet with an address of said primary concentrator; and sending the packet as modified in this way to the primary concentrator;

said steps a), b), c), and d) being subsequently implemented by the primary concentrator.

This variant makes it possible to implement a traffic distribution policy that gives precedence to sending packets to the correspondent from the primary concentrator rather than from a secondary concentrator.

According to other particular characteristics, after said correspondent has sent a data packet destined for said user equipment:

a') said packet is intercepted by said primary concentrator, or by a secondary concentrator situated on a path followed by the packet and terminating at said address of the primary concentrator;

b') when necessary, the primary concentrator or a secondary concentrator inserts multiple path options into the packet; and c') the primary concentrator or a secondary concentrator replaces the destination address of the packet with an address of the user equipment, and sends the packet as modified in this way to the user equipment.

By means of these provisions, it is ensured that the packets sent in return to the user equipment by the correspondent are routed effectively. Specifically, since the source address of the packet previously received by the correspondent for this connection (external address) is an address of the primary concentrator, the correspondent uses this external address as the destination address for packets sent for this connection, even though the packets are in fact destined for the user equipment.

According to even more particular characteristics, step c') comprises the following substeps:

said primary concentrator replaces the destination address of the packet with the address of a secondary concentrator, inserts into the packet an option mentioning the address of said user equipment, and sends the packet as modified in this way to said secondary concentrator;

the secondary concentrator replaces the destination address of the packet by the address of the user equipment mentioned in said option; and the secondary concentrator sends the packet as modified in this way to the user equipment.

By means of these provisions, it is possible to implement a traffic distribution policy that gives precedence to sending packets to the user equipment from a secondary concentrator rather than from the primary concentrator.

According to other particular characteristics, after said user equipment has initialized a multipath connection and sent a first data packet over that connection, one concentrator of said plurality of concentrators is designated as the "primary" concentrator when said packet is initially intercepted by said concentrator.

By means of these provisions, it is determined in simple and automatic manner which concentrator in a group of concentrators associated with said user equipment is to play the role of the primary concentrator (and thus the concentrator(s) that are to play the role of the secondary concentrator(s)) for a given multipath connection.

In a variant, a concentrator of said plurality of concentrators may be designated as the "primary" concentrator or as a "secondary" concentrator as a function of the destination address of said received packet, or as a function of the availability of a route from the concentrator for reaching said correspondent, or indeed as a function of the quality of service offered by the concentrator for reaching said correspondent.

In general manner, the invention thus offers the following advantages:

optimizing management of the network connection concentrator(s);

making it possible to adapt to conditions for connection to the networks (e.g. as a function of available access data rates);

increasing the network capacity used by a terminal;

benefiting from advantages made available by the link aggregation mechanisms, but without requiring any particular intelligence for remote servers;

providing a secure procedure for switching traffic to backup servers; and proactively detecting network anomalies, enabling appropriate decisions to be taken for redirecting traffic, where necessary, to some other network connection concentrator.

It should be observed that the method of the invention for emulating a multipath connection applies to any type of IP traffic. In particular, the method may advantageously be implemented for exchanging data transported using any of the following protocols: TCP, UDP, SCTP, IP-in-IP, TCP-over-UDP, or TCP-over-TCP. By way of example, setting up GRE or IP-in-IP tunnels makes it possible to aggregate some or all of the IP traffic (including in particular TCP and UDP traffic) between a terminal and one or more concentrators.

It should also be observed that said user equipment may be any device compatible with the IP protocol. The user equipment may be of any type, e.g. a terminal, a router, a residential gateway, or a set-top box, and it may be an MIF device or a single-interface device. It may have one or more IP addresses allocated to each of its physical or logical interfaces. It may also have only one interface, in which case it is assumed that it is situated behind a proxy (such as a router or a residential gateway) connected to one or more networks and compatible with a link aggregation mechanism. Furthermore, the user equipment may be configured to abstain from using a network link aggregation mechanism for certain networks, or under certain operating conditions (e.g. when network connection concentrators are overloaded).

Furthermore, for a user equipment that is compatible with the (above-mentioned) MPTCP protocol, the invention makes it possible to improve significantly the engineering and the operation of such multiple connections (as described below) by improving the quality and the robustness of the process of managing subflows that is characteristic of the MPTCP protocol. For example, putting tunnels into place as mentioned above may advantageously be combined with MPTCP functions for engineering reasons, such as off-loading MPTCP proxies if the remote server is compatible with the MPTCP protocol; a network operator can thus optimize the network resources that are dedicated to an MPTCP proxy.

In a second aspect, the invention also relates to various devices.

Thus, the invention relates firstly to a concentrator, referred to as a "primary" concentrator, situated in a network to which a given user equipment is connected, the concentrator including means for intercepting data packets sent or received by said user equipment and for aggregating connections using a plurality of paths that can be used by the user equipment. Said primary concentrator is remarkable in that it further comprises means for:

intercepting a data packet sent by the user equipment to a correspondent;

when necessary, removing from the packet all of the multipath options;

replacing the source address of the packet with an address of a primary concentrator; and sending the packet as modified in this way to said correspondent.

According to particular characteristics, said primary concentrator further comprises means for:

intercepting a data packet sent by said correspondent and destined for said user equipment;

when necessary, inserting multipath options in said packet;

and also means for:

replacing the destination address of the packet with an address of the user equipment, and sending the packet as modified in this way to the user equipment, and/or replacing the destination address of the packet with the address of another concentrator, referred to as a "secondary" concentrator, inserting in the packet an option mentioning the address of the user equipment, and sending the packet as modified in this way to said secondary concentrator.

Secondly, the invention relates to a concentrator, referred to as a secondary concentrator, situated in a network to which a given user equipment is connected, the concentrator including means for intercepting data packets sent or received by said user equipment and for aggregating connections using a plurality of paths that can be used by the user equipment. Said secondary concentrator is remarkable in that it further comprises means that are triggered as a result of said secondary concentrator intercepting a data packet sent by the user equipment and destined for a correspondent, to:

remove from the packet, when necessary, all of the multipath options, replace the source address of the packet with an address of another concentrator, referred to as a "primary" concentrator, and send the packet as modified in this way to said correspondent; and/or insert in the packet an option mentioning said source address of the packet together with an option mentioning the destination address of the packet, replace the source address of the packet with an address of said secondary concentrator, replace the destination address of the packet with an address of said primary concentrator, and send the packet as modified in this way to a primary concentrator.

According to particular characteristics, said secondary concentrator further comprises means for:

receiving a data packet from a primary concentrator or respectively from said correspondent;

replacing the destination address of the received packet with the address of the user equipment mentioned in an option contained in the received packet, or respectively mentioned in a connection table accessible to said secondary concentrator; and sending the packet as modified in this way to said user equipment.

The advantages made available by these devices are essentially the same as those made available by the methods described briefly above for emulating a multipath connection.

It should be observed that it is possible to implement these various devices in the context of software instructions and/or in the context of electronic circuits.

In a third aspect, the invention relates to a system for emulating a multipath connection, the system comprising a primary concentrator as described briefly above together with at least one secondary concentrator as described briefly above.

The invention also provides a computer program downloadable from a communications network and/or stored on a computer-readable medium and/or executable by a microprocessor. The computer program is remarkable in that it includes instructions for executing steps of any one of the methods of emulating a multipath connection set out briefly above, when executed on a computer.

The advantages made available by the system, and by the computer program are essentially the same as those made available by the methods of emulating a multiple path connection set out briefly above.

BRIEF DESCRIPTION OF THE DRAWINGS

Other aspects and advantages of the present invention appear on reading the following detailed description of particular embodiments given as non-limiting examples. The description refers to the accompanying figures, in which:

FIG. 2a, mentioned above, shows the failure of an attempted MPTCP connection in the configuration of FIG. 1a;

FIG. 4b, mentioned above, shows the failure of an attempted MPTCP connection in the configuration of FIG. 4a;

DETAILED DESCRIPTION OF ILLUSTRATIVE EMBODIMENTS

Figure 1A:
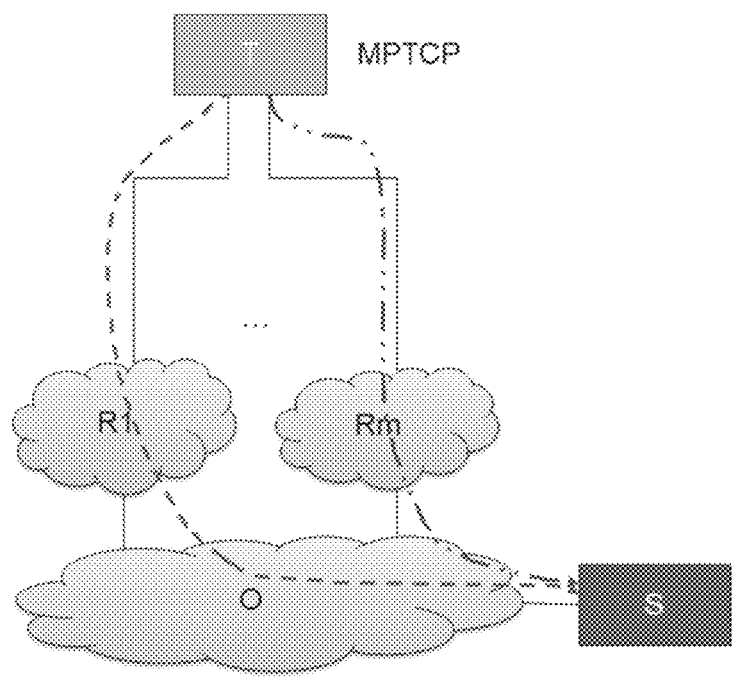
FIG. 1a, mentioned above, shows a terminal T that is compatible with MPTCP and connected to a server S via a plurality of IP networks.
Figure 1B:
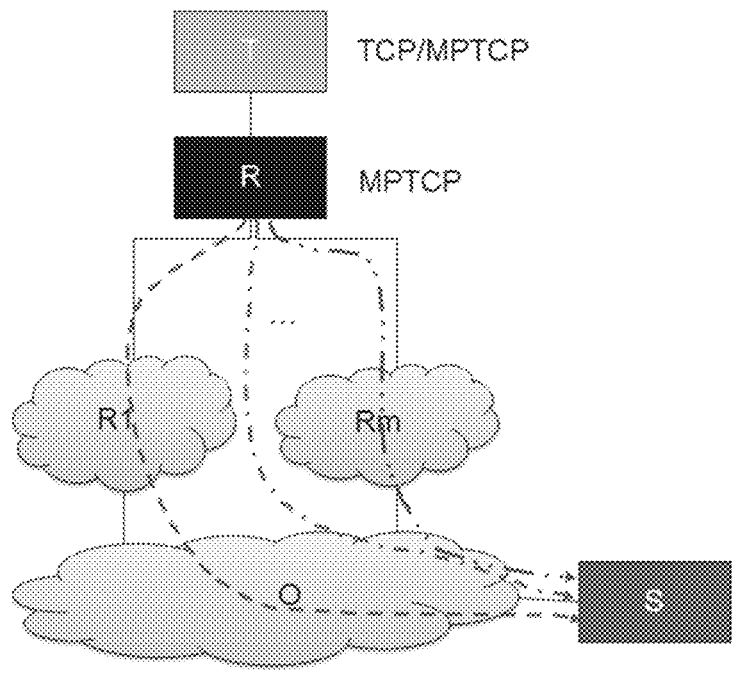
FIG. 1b, mentioned above, shows a terminal T that is compatible with TCP or MPTCP, and that is placed behind a proxy R compatible with MPTCP and connected to a server S via a plurality of IP networks.
Figure 2A:
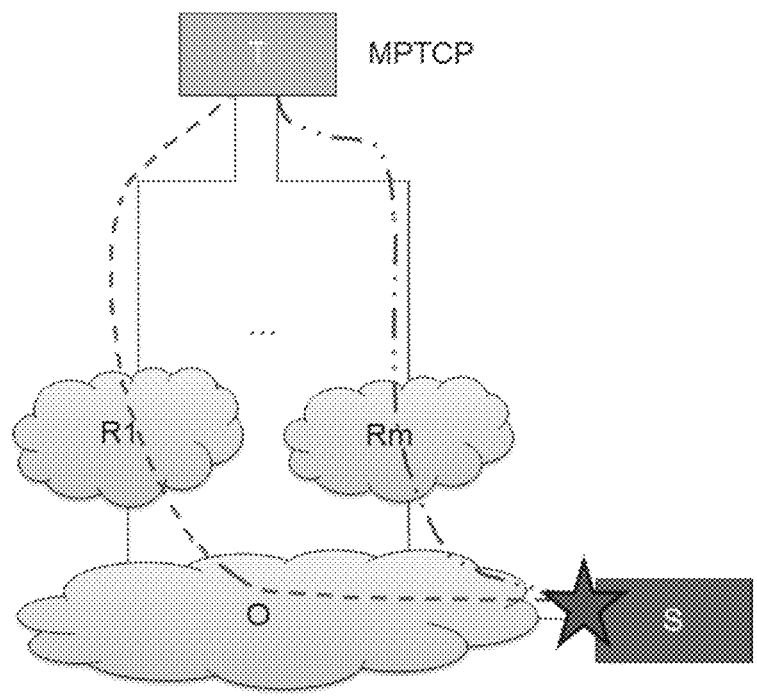
Figure 2B:
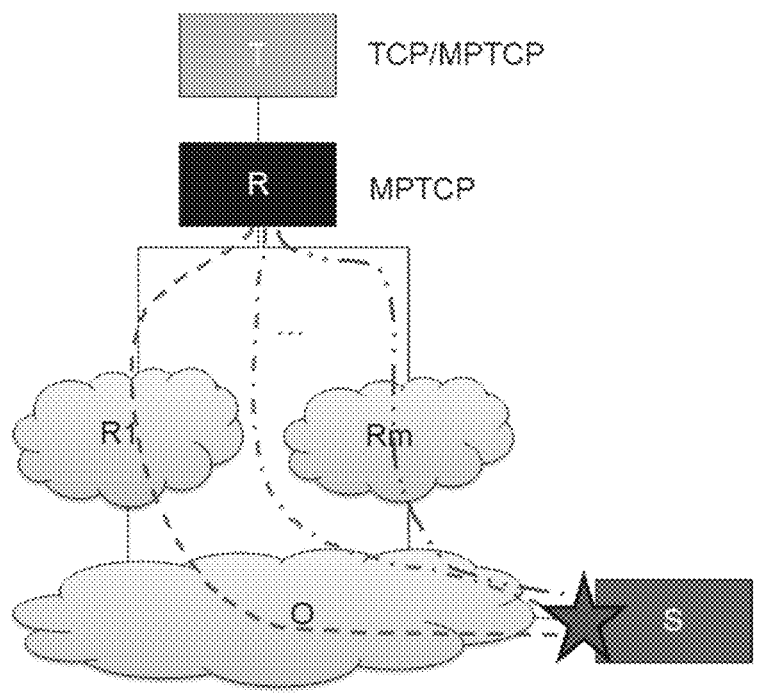
FIG. 2b, mentioned above, shows the failure of an attempted MPTCP connection in the configuration of FIG. 1b.
Figure 3A:
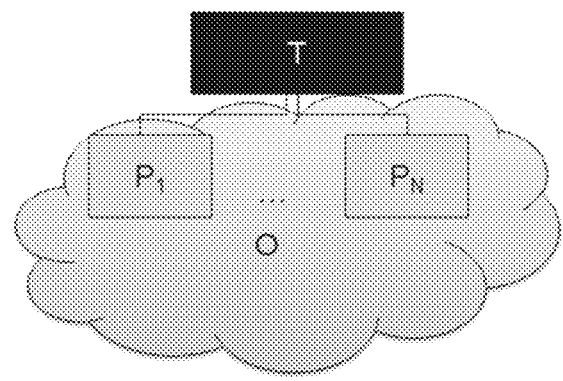
FIGS. 3a, 3b, and 3c, mentioned above, show various types of architecture associated with network connection concentrators.
Figure 3B:
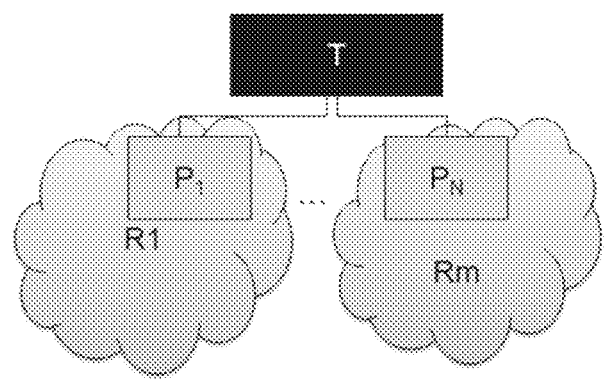
Figure 3C:
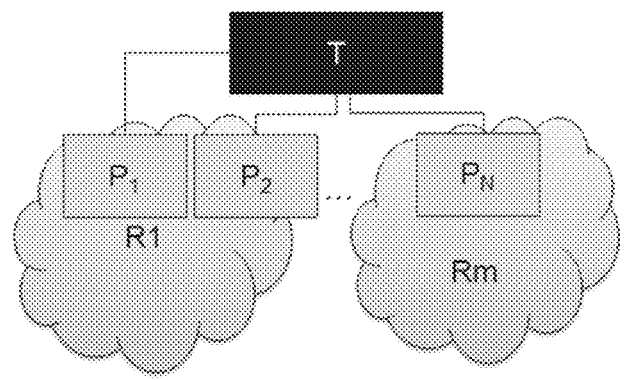
Figure 4A:
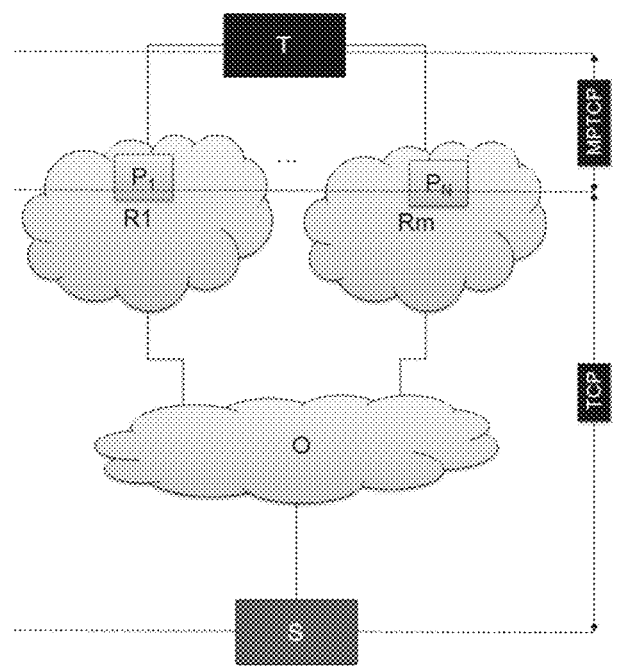
FIG. 4a, mentioned above, shows a terminal T compatible with MPTCP and connected to a server S compatible with TCP via N network connection concentrators ($P_1, P_2, \ldots, P_N$) situated in m access networks R1, . . . , Rm.
Figure 4B:
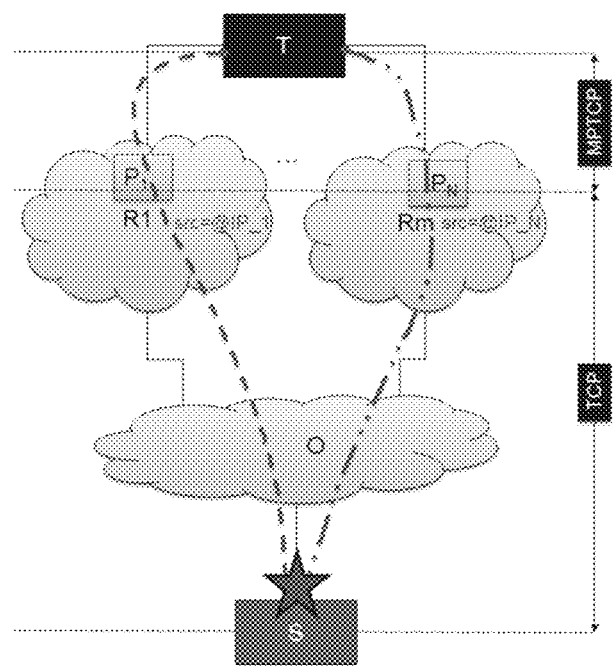

The invention relates to the communication paths usable by a user equipment, each respective interface of the user equipment being connected to a respective path. This set of paths may comprise all of the paths known to the user equipment, or else only some of them.

The invention applies in general manner to any protocol governing multipath IP connections. There follows a description of the invention applied to the MPTCP protocol, after a few reminders about certain properties of this protocol.

Firstly, it should be recalled that the transmission control protocol (TCP) as defined in particular in Document RFC 793 is one of the main protocols used by terminals connected to an IP network (e.g. the Internet), such that the literature often refers to the "TCP/IP" suite of protocols. The TCP protocol serves to convey a stream of digital data in reliable, ordered, and error-free manner between applications executed on terminals connected to a local network (e.g. an Intranet) or to the Internet. The TCP protocol operates at the level of the transport layer of the OSI model. Web browsers use the TCP protocol when they connect to remote servers; the TCP protocol is also used for conveying email or for transferring files from one place to another. Protocols such as HTTP, HTTPS, SMTP, POPS, IMAP, SSH, FTP, Telnet, and various other protocols are transported over TCP connections. A TCP connection is identified by the address and the port number of the source terminal, and also by the address and the port number of the destination terminal.

Two terminals may insert so-called "TCP options" in the TCP messages exchanged between them, e.g. for the purpose of optimizing the quality of the TCP connection. Such options occupy the space available at the end of the TCP header, and are of a length that is expressed in octets (8-bit bytes). The kind of the option is a unique identifier describing the nature of the TCP option. For example, the value "0" indicates the end of the list of options, and the value "2" indicates the maximum size of the TCP segment (i.e. maximum segment size (MSS)).

The arrival of MIF terminals makes it possible to use the resources of a plurality of paths via the available networks in order to set up a TCP connection, making use of some or all of the IP addresses allocated to the various interfaces of MIF terminals. Nevertheless, this possibility introduces complexity that is characteristic of the mode of operation of the TCP protocol: given that any TCP connection is associated with an IP address and a port number, any change to at least one of those items of information is of a nature to penalize the operation of the current TCP connection, and thus the service making use of said TCP connection. Such a change is particularly prejudicial when the terminal is given a new IP address, or when the terminal connects to another network, or indeed when the interface with which the IP address is associated is no longer available. For example, means for informing a remote TCP third party that an IP address is no longer valid are then needed in order to ensure that an existing connection is maintained without interrupting the services made available by that TCP connection.

In 2009, the "mptcp" workgroup of the IETF was tasked with specifying extensions to the TCP protocol capable of accommodating the constraints imposed by the possibility of allocating a plurality of IP addresses to the various logical or physical interfaces of a terminal. That workgroup published initial specifications for the MPTCP protocol (cf. A. Ford, C. Raiciu, and M. Handley "TCP extensions for multipath operation with multiple addresses", RFC 6824, January 2013)—that certain smartphones and certain operating systems are already capable of implementing. The MPTCP protocol serves in particular to satisfy the need to ensure continuity for an IP session in the event of the terminal being mobile. The IETF envisages causing the status of present MPTCP specifications to advance so that they become genuine standards in the meaning of the IETF.

The MPTCP protocol has thus been proposed for minimizing any risks of untimely rupture of a TCP connection, e.g. associated with such changes of address, and more generally to satisfy the requirements raised by a context in which a terminal has the ability to connect to one or more networks via one or more interfaces.

Furthermore, in the event of a failure of an attempt to set up an MPTCP connection, Document RFC 6824 makes provision for the connection to switch automatically to a simple TCP connection.

Figure 5:
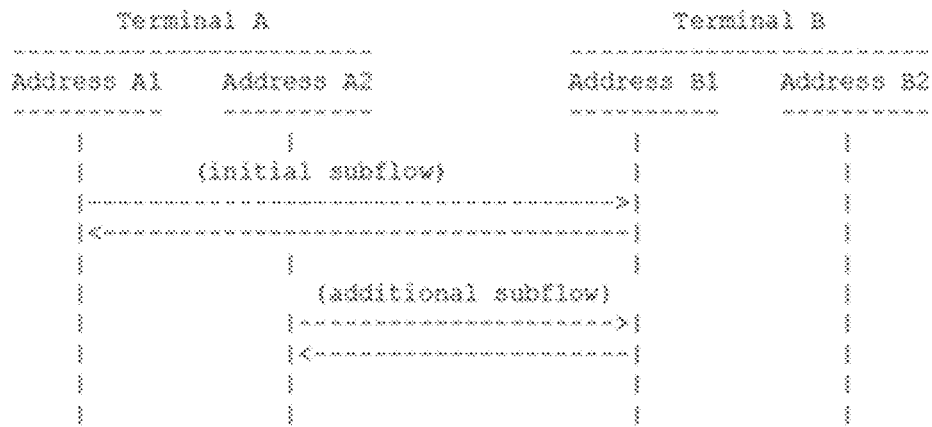
FIG. 5 shows an aggregate of TCP sub-flows forming a single MPTCP connection.

In the context of the MPTCP protocol, the term "subflow" is used to designate a TCP connection that relies on using one of the available (IP address, port number) pairs. As a result, an MPTCP connection is an aggregate of TCP subflows. By way of example, FIG. 5 shows an MPTCP connection between a terminal A and a terminal B; the initial subflow is set up between the address A1 of the terminal A and the address B1 of the terminal B; subsequently, an additional subflow is set up between the address A2 of the terminal A and the address B1 of the terminal B. An MIF terminal can thus be connected to new networks, or can detach itself from some networks, while maintaining a single multipath connection.

A particularly advantageous example of an application of the MPTCP protocol is transferring voluminous files while using the resources of the file transfer protocol (FTP). A device acting as an FTP user equipment can make use dynamically of all of the available paths enabling it to access an FTP server, providing that FTP server is capable of using the various MPTCP connections set up by the FTP user equipment. The time required to transfer data is thus significantly shortened compared with a TCP connection.

Various usages may be envisaged for the MPTCP protocol, such as:
  exchanging data between a plurality of wireless access networks;
  reducing the load on a mobile network by switching a fraction of the traffic to a wireless access network;
  optimizing the use of network resources by making simultaneous use of the resources of a plurality of access links and by sharing the traffic load from one or more MPTCP connections over those various links, thus making it possible significantly to increase the bandwidth associated with setting up an MPTCP connection; and
  making an MPTCP connection more reliable by switching the traffic switched over a primary path to a backup path in the event of a rupture in the primary path, and to do so in a manner that is transparent for the user (i.e. without interruption of service).

Operating systems make dedicated programming interfaces known as application programming interfaces (APIs) available to applications in order to interact with the TCP and IP layers. The conventional API made available to TCP/IP applications is the "socket" interface. The "socket" interface is characterized by several attributes, such as the "local socket address", the "remote socket address", and the "protocol". Extensions to the TCP/IP API, known as the MPTCP API have been specified by the IETF in Document RFC 6897 to enable applications to control MPTCP connections.

An MPTCP connection is initialized like any conventional TCP connection, except that a TCP option known as MP_CAPABLE (i.e. indicating that the sending terminal is compatible with the MPTCP extensions) is included in the message containing the connection initialization flag (SYN) and in subsequent messages. An MPTCP terminal can inform the remote terminal about the availability of an additional IP address by using a TCP option known as ADD_ADDR, without necessarily creating an associated subflow.

Indicating a plurality of IP addresses that are available and suitable for use in communication with a third party can lead to failure in setting up certain TCP subflows, because the external IP addresses as perceived by the remote terminals need not be the same as those that are visible locally. That is why the ADD_ADDR option of the MPTCP protocol includes an address identifier referred to as "address ID", that is used to identify without ambiguity an available IP address. This provision is intended to avoid the problems induced by the presence of an NAT on the path followed by the packets between the two terminals that have set up an MPTCP connection. The ADD_ADDR option is also used for transmitting a port number in the event that one of the MPTCP terminals does not use the same port number for all of the available IP addresses.

Likewise, the MPTCP protocol specifies provisions that are intended in particular to make it possible to pass through firewalls. More precisely, the specification of the MPTCP protocol stipulates that the sequence numbers as indicated in the TCP header are specific to each subflow, while the sequence number indicated in the data sequence signal (DSS) option of the MPTCP protocol serves to associate these subflows with the same MPTCP connection.

The MPTCP protocol thus seeks to escape from the constraints imposed by the massive proliferation of so-called "middle boxes" (i.e. intermediate functions in a communications chain), such as NATs and firewalls that are deployed in current networks.

In particular, the MPTCP protocol makes use of the following TCP options:

MP_CAPABLE: this option, mentioned above, is used to inform the remote terminal that the sending terminal is compatible with the MPTCP options;

ADD_ADDR: this option, mentioned above, is used to add a new address; it includes an optional two-octet field for also providing a port number, where appropriate;

REMOVE_ADDR: this option is used for removing an address;

MP_PRIO: this option is used for modifying the priority of a connection;

MP_JOIN: this option is used for identifying the TCP connection that is associated with setting up a new subflow;

MP_FAIL: this option is used to return to TCP mode without MPTCP options; and

MP_FASTCLOSE: this option is used to close an MPTCP connection quickly.

The MPTCP protocol may be activated in several modes:

native mode: two MPTCP terminals set up all of the subflows that correspond to the available address and/or port numbers; and make use of all of the subflows;

primary mode: two MPTCP terminals specify subflows, but only a subset of these subflows is in fact used for transferring data;

secondary mode: in the event of non-availability (or overload) of the "primary" subset of subflows, a "secondary" subset of subflows is then requested in order to provide continuity of the MPTCP connection; and backup mode: two MPTCP terminals use a single subflow; in the event of failure, traffic is switched to a new subflow created for that purpose.

There follows a description of an implementation of the method of the invention for emulating a multipath connection.

In order to avoid the complexity that is inherent to encapsulation schemes, the present implementation proposes using TCP or IP options (where IP options are optional fields as described in Document RFC 791 of the IETF, that may be included in an IPv4 packet) for communications of various kinds, including communications that do not rely on any particular transport protocol, or communications that rely on the UDP protocol.

Nevertheless, for purely illustrative purposes, the following description applies to an application of the present implementation to the MPTCP protocol.

It should be observed that other means for encoding the information contained in the TCP options that are defined below may be considered, depending on the mode of communication that is activated between the concentrators. By way of example, the term "option" is also used to designate an IPv6 extension header, an IPv4 option, the "source address/source port number" field(s) of an encapsulated packet, the "destination address/destination port number" field(s) of an encapsulated packet, one or more fields of an encapsulated packet, one or more fields of a packet encapsulating an original packet, or an extension of an encapsulation scheme, and also an option of the TCP protocol or of some other transport protocol, or indeed a combination of these various means.

Discovering Other Connection Concentrators Serving a User Equipment or a Group of User Equipments The purpose of this procedure is to enable each group of concentrators that might serve a single user equipment or a single group of user equipments to acquire the addresses of the other concentrators of the group in dynamic manner.

It should be observed that a concentrator may belong to one or more groups. It should also be observed that the IP address used to reach a first concentrator from a second concentrator of the group is not necessarily the address used by the first concentrator for receiving a packet sent by a user equipment, nor the address used (i.e. the external address) by that first concentrator for sending a packet obtained from a packet coming from a user equipment.

Naturally, if no other concentrator has been discovered, then the procedure is not implemented. It is activated immediately after discovering a new concentrator.

In a first variant, the procedure is performed by a simple configuration operation on said concentrators.

In a second variant, a service alias is configured on each concentrator. The alias may be structured in the form of a domain name, or a service record SRV (according to Document RFC 2782, an SRV record is a data set of the DNS system specifying the location, i.e. the machine name and the port number, of servers making given services available), or any other appropriate format, e.g. "Concentrator_Rennes", "Concentrator_France_Telecom", "Concentrator_HybridAccess", or "proxy_group_1". The alias may also be structured like an IP address (IPv4, IPv6, or both). Preferably, each concentrator, on starting and at regular intervals, contacts an alias resolution service (e.g. a DNS service) in order to recover the list of IP addresses of the concentrator group to which it belongs.

In a third variant, use is made of the resources of a dynamic routing protocol such as open shortest path first (OSPF), intermediate system to intermediate system routing protocol (IS-IS), or border gateway protocol (BGP). For example, each concentrator uses a dedicated message to announce the alias of a concentrator group or the aliases of the concentrator groups to which it belongs, together with the address for reaching it (e.g. an IPv4 or an IPv6 address).

Figures 6, 11, 12:
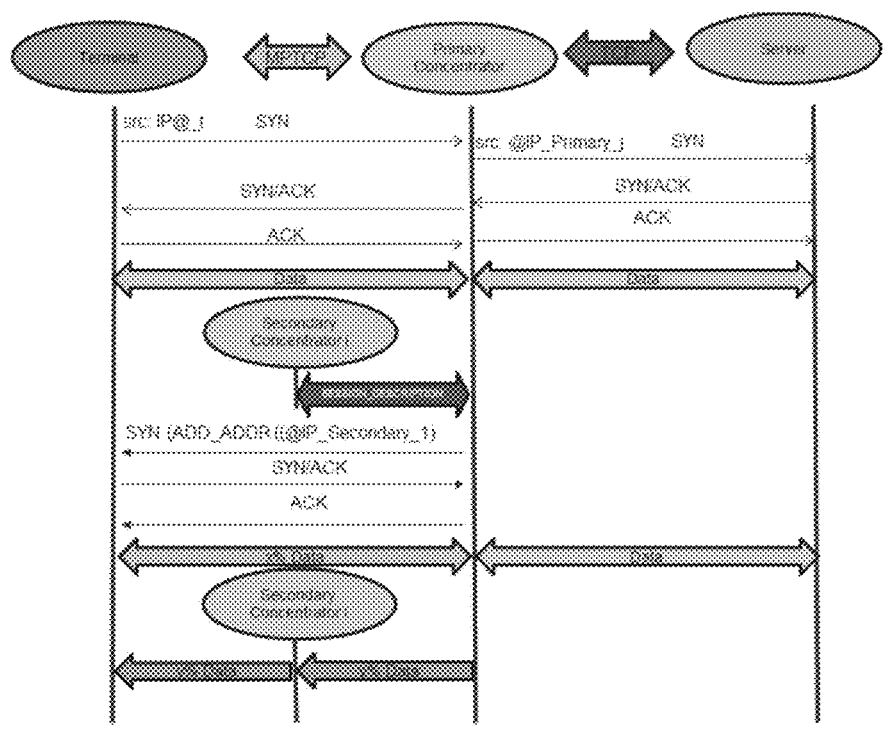
FIG. 6 shows a format example for the announcement messages sent by a concentrator to other concentrators.
FIG. 11 shows an option that can be used by a device to indicate a load sharing preference for a given path among a plurality of paths.
FIG. 12 shows a message exchange sequence in a variant in which the packets sent by a server S are initially intercepted by a primary concentrator.

As shown in FIG. 6, this message may for example be a specific message encoded using type, length, value (TLV) mode in which the type needs to be assigned by the Internet assigned numbers authority (IRNA), the length is variable, and the value comprises the following sub-TLVs:

| Type of sub-TLV | Length | Name |
|---|---|---|
| 1 | Variable | ALIAS sub-TLV |
| 2 | Variable | ADDRESS sub-TLV |

A plurality of "ADDRESS sub-TLV" sub-TLVs may be present if a plurality of addresses are known for a given alias. Other sub-TLVs may be defined.

On receiving this message, the other concentrators store in memory the list of IP addresses of the concentrators with which they share a common alias (i.e. concentrators as specified in a "ADDRESS sub-TLV" sub-TLV).

It should be observed that the three above-described variants may be combined.

Authenticating Connection Concentrators

In order to avoid active sessions being intercepted (illegitimate traffic interception), an authentication procedure between concentrators of the same group may advantageously be put into place.

Authentication may be performed by using the resources of a protocol such as extensible authentication protocol (EAP, RFC 3748 (https://tools.ietf.org/html/rfc3748)), or any other protocol such as EAP-TILS (RFC 5281, https://tools.ietf.org/html/rfc5281), EAP-TLS (RFC 5216, https://tools.ietf.org/html/rfc5216), or EAP-mutual cryptographic binding (RFC 7029, https://tools.ietf.org/rfc7029).

By way of example, at least one security key may be configured beforehand for each concentrator. Such a key is used to produce a security hash that is sent to the other concentrators, and also to authenticate other concentrators. Any anomaly detected during the procedure of authenticating a concentrator leads to messages coming from that concentrator being rejected.

More precisely, several variants can be envisaged. For example:
  overall mutual authentication: this procedure is activated once only by the concentrators: following the stage of discovering other concentrators, a concentrator initializes an authentication stage to authenticate itself with the other concentrators, and to authenticate said discovered concentrators; this authentication stage is initialized on each discovery of a new concentrator belonging to a given group; in the event of conflict between two simultaneous authentication sessions initialized by two concentrators, both concentrators preferably maintain only the session that was initialized first;
  mutual authentication by connection: unlike the global authentication mode, the authentication procedure is reiterated each time a request is made to create a context in a secondary concentrator;
  authentication with a trusted entity: this mode assumes that the concentrators authenticate themselves with a trusted entity; in order to authenticate other concentrators belonging to the same group, a concentrator contacts the trusted entity.

One or more sessions may be needed for this mutual authentication.

Exchange of Allocated External Addresses (and Other Information) by Each Connection Concentrator)

Two concentrators that are mutually authenticated proceed to exchange information, such as their external addresses, their load distribution policies, their user equipment profiles, the use of resources, path identifiers, routes, or interfaces to a user equipment, local policies. The concentrators can thus exchange the mode for selecting the primary concentrator that is to be activated, the use of a single external address for all of the concentrators, etc.

Information may also be exchanged between concentrators throughout the lifetime of a connection. Particularly, the primary concentrator may instruct a secondary concentrator to modify its load sharing policy.

The concentrators in a single group may also exchange information, e.g. such as the quality of the local network, the number of active connections, or the available bandwidth. Other control messages may be used (e.g. switch over to simple TCP mode for certain streams).

For this exchange of information, the concentrators may activate a secure mode, e.g. by including the above-mentioned security hash in all messages sent to another concentrator. Any anomaly detected by implemented this secure mode leads to the messages from the concentrator in question being rejected.

A concentrator can maintain an array specifying the time it took to reach each of the other concentrators of the group. This information may be used for deciding whether to involve one or more secondary concentrators in a single connection. The concentrators that might lead to quality distortion may then be excluded from a connection.

Traffic from a User Equipment

It is assumed that a user equipment, e.g. a terminal T that is compatible with multipath communications determines a set $(P_1, P_2, \ldots, P_N)$ of N concentrators (e.g. a list of MPTCP proxies) situated in at least one network to which the terminal T is connected. This determination may be the result of the terminal T being statically configured, or it may be the result of a dynamic identification or a dynamic discovery procedure.

The terminal T initializes a multipath connection with a server S, and sends a first data packet via a first path. The present invention puts no limit on the criteria for selecting a first path.

The first packet is then intercepted by a concentrator on said first path. On receiving the packet, the concentrator verifies whether a context associated with the packet is already present in its "connection table". The connection table contains all of the information characteristic of the multipath connections (including subflows) in which the concentrator is currently involved ("active" connections) and/or that have already been registered by a primary concentrator in the connection table of a secondary concentrator; this information comprises in particular the addresses and port numbers, together with other information such as the load sharing ratio or the "primary" or "secondary" status of the concentrator.

If the concentrator does not find any context, it then declares itself the "primary concentrator" for this connection. It updates an attribute in its connection table in order to save this information.

It is clear that other modes of determining the primary concentrator are possible. Here are a few examples:

selection on the basis of the destination address of the packet: for example, when starting from France, a first concentrator is configured as the primary concentrator for reaching servers that are located in France, whereas a second concentrator is configured as the primary concentrator for reaching servers that are located in Europe outside France; if this first mode is activated, a concentrator may be the first to receive a packet in the context of a multipath connection, but that does not mean that it acts as the primary concentrator for that connection; in practice, on receiving a packet via a concentrator, it verifies whether it is maintaining a context that corresponds to the packet; if a context is found, then the concentrator proceeds to process the packet in compliance with the information in the connection table; if no context is found, then the concentrator, given the destination address of the packet, verifies whether the packet needs to be processed locally or needs to be relayed to another concentrator (acting as primary concentrator for this connection); a variant of this mode consists in using a routing system on the basis of the autonomous system (AS) in order to take the decision; for example, the primary concentrator for a connection is the concentrator that is associated with the same AS as the server S, or that presents some minimum number of AS hops in order to reach the destination address;

selection on the basis of the availability of a route for reaching the server S: because of inter-domain routing policies, certain servers cannot always be reached from certain networks; this mode of selecting the primary concentrator serves to avoid this problem by giving priority to the concentrator that guarantees an operational routing path; it is assumed that the concentrators do not have the same routing table; in practice, on receiving a packet, a concentrator verifies whether it is maintaining a context that corresponds to the packet; if a context is found, then the concentrator proceeds to process the packet in application of the information in the connection table; if no context is found, then the concentrator verifies whether a route for reaching the destination address is available locally; if so, the packet is processed locally, otherwise the packet is relayed to another concentrator (which will act as primary concentrator for the connection);

selection on the basis of quality of service for reaching the server S: in this mode, the concentrator selected as the primary concentrator is the concentrator that optimizes the quality of service to the server S; mechanisms such as that described in IETF document "draft-ietf-idr-performance-routing" may be used for facilitating the exchange of quality of service information; it is assumed that the concentrators activate a similar mechanism for collecting at least one performance metric for reaching a given destination; for a given address of the server S, this mode makes it possible to select the concentrator that optimizes said performance metric for reaching this address; in practice, on receiving a packet, a concentrator verifies whether it is maintaining a context that corresponds to the packet; if a context is found, then the concentrator proceeds to process the packet using the information in the connection table; if no context is found, then the concentrator verifies whether it is the concentrator that optimizes the performance metric for reaching the address of the server S; if so, the packet is processed locally, otherwise the packet is relayed to the concentrator that optimizes said metric (which will act as the primary concentrator for this connection); activating this mode in combination with selecting the concentrator that offers the best quality of service over the network segment lying between the user equipment and the concentrators, makes it possible to optimize quality of service end-to-end (i.e. between the terminal T and the server S).

It should be observed that a concentrator may act as a "primary" concentrator for some connections and as a "secondary" concentrator for other connections.

Furthermore, in order to apply certain traffic engineering constraints in dynamic manner, provision may be made for a concentrator to act as:

a primary concentrator for all of the connections of all of the terminals if a failure of another concentrator is detected; or a primary concentrator for all of the connections of a given terminal, in order to satisfy certain regulatory constraints, such as legal interception.

Furthermore, still for the purpose of applying traffic engineering policies in dynamic manner, concentrators may advantageously use dynamic configuration mechanisms such as diameter, common open policy service (COPS) or NETCONF.

Once the primary concentrator has been determined, it sends a message to the other concentrator(s) providing information about the new session context, and also communicating information about the connection. To do this, it may use a SESSION_DESCRIPTOR option, for example.

Figure 7:
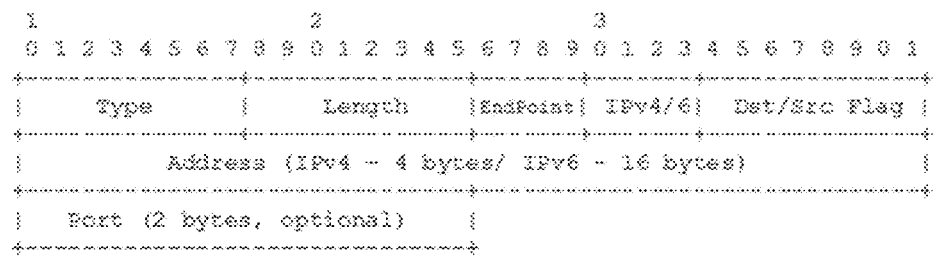
FIG. 7 shows a first format example for the session description messages sent by a primary concentrator to secondary concentrators.

In a first variant, shown in FIG. 7, the SESSION_DESCRIPTOR option is structured in the form of a "container" describing the current session (where a "container" is a structure for grouping together characteristic and descriptive information about a current session, which avoids any need to manipulate an entire set of distinct options, each being descriptive of only one item of information that is characteristic of a current session). This SESSION_DESCRIPTOR option gives at least the address of the terminal T and the address of the server S. The address of the terminal T and the address of the server S may be coded using an "EndPoint" option. It is specified whether it is an IPv4 address or an IPv6 address. The "Dst/Src flag" attribute specifies whether the option is conveying the source address or the destination address.

Figure 8:
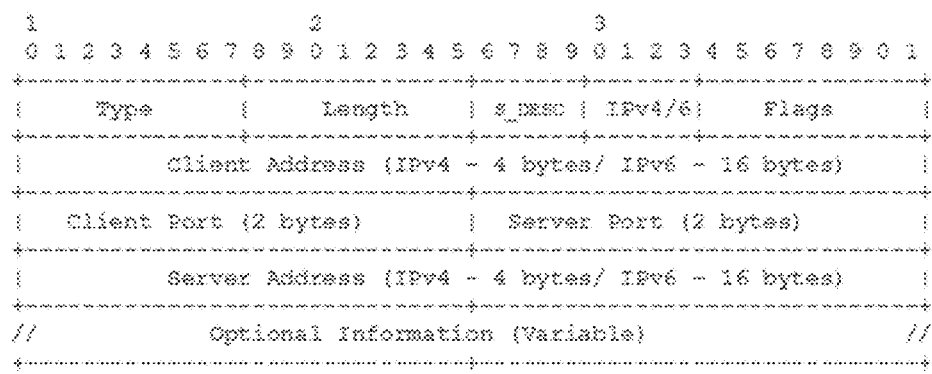
FIG. 8 shows a second format example for the session description messages sent by a primary concentrator to secondary concentrators.

In a second variant, shown in FIG. 8, the SESSION_DESCRIPTOR option is structured in the form of a dedicated option. The SESSION_DESCRIPTOR option gives the address of the terminal T and the address of the server S. The "Flags" attribute is used for potential future uses, such as indicating the type of optional information elements included in the option. The SESSION_DESCRIPTOR option may in particular include the external address and the port number that are used by the primary concentrator for the connection. This address and this port number need to be used throughout the connection, otherwise the server S will reject the packet. A security hash may be included in this option.

The primary concentrator replaces the source address of the packet received with one of its own addresses, it removes all of the MPTCP options, and then sends the packet over the next hop. The port number may also be modified by the concentrator.

It should be observed that the primary concentrator does not have to comply with any particular chronology concerning the above-described steps of sending the SESSION_DESCRIPTOR option and of modifying the data packet.

When setting up a multipath connection, a primary concentrator informs the user equipments not only of its own addresses (@IP_Primary_j), but also the addresses of the other concentrators, i.e. the secondary concentrators (@IP_Secondary_i). In doing this, the primary concentrator acts as though these addresses (@IP_Secondary_i) were configured locally thereto. This option makes it possible to prepare the user equipment (and any intermediate firewall) to receive the traffic from at least one secondary concentrator, without the terminal previously sending any packet to the secondary concentrator. Specifically, in the absence of this announcement operation, packets conveyed by a secondary concentrator to the terminal would be rejected by the user equipment or by the intermediate firewall. The primary concentrator can announce all of the addresses or only some of the addresses of the secondary concentrators. By way of example, one criterion for making such a selection would be the loads on the concentrators or the quality of an access network.

The primary concentrator can announce the addresses of other concentrators, i.e. secondary concentrators (@IP_Secondary_i) in a single message, or by using different messages. Depending on the selected procedure for managing a multipath connection, the primary concentrator may announce the addresses of the secondary concentrators (@IP_Secondary_i) while setting up the first subflow, or subsequently.

The terminal T can send the following packets via the same path or via different paths. These packets are intercepted by concentrators, which then implement the following steps.

The concentrator extracts the session information (including the destination address, the destination port number, the source IP address, and the source port number). Thereafter, it verifies in its connection table whether a context is already present for this session.

If no context is found, it then executes the above-described procedure triggered by receiving a first packet.

If a context associated with the session is already present, the concentrator verifies, for this connection, whether it is supposed to act as a primary concentrator or as a secondary concentrator (which is specified explicitly in the context consulted by the concentrator).

If it is the primary concentrator for this connection, the concentrator executes the packet modification procedure and sends the modified packet, as described above. It needs to use the same external address and the same port number as those that have already been used for processing the first packet of the connection. This information is conserved in the connection table.

If the concentrator is a secondary concentrator for this connection, then it behaves in compliance with one of the following variants.

In a first variant, the secondary concentrator relays received packets to the primary concentrator. More precisely, the secondary concentrator replaces the source address of each received packet with one of its own addresses, replaces the destination address of the packet with an address of the primary concentrator, and then sends the packet to the primary concentrator of the connection. The concentrator needs to include two "EndPoint" options, one including the address of the destination server and the other conveying the address of the user equipment. By way of example, FIG. 9 shows a message exchange sequence in the context of this first variant.

In a second variant, the secondary concentrator processes received packets locally, without relaying them to the primary concentrator. The secondary concentrator executes the packet modification procedure and it sends the modified packet, as described above. It needs to use the same external address and the same port number as have already been used by the primary concentrator for processing the first packet of the connection. This information is conserved in the connection table. By way of example, FIG. 10 shows a message exchange sequence in the context of this second variant.

Figure 9:
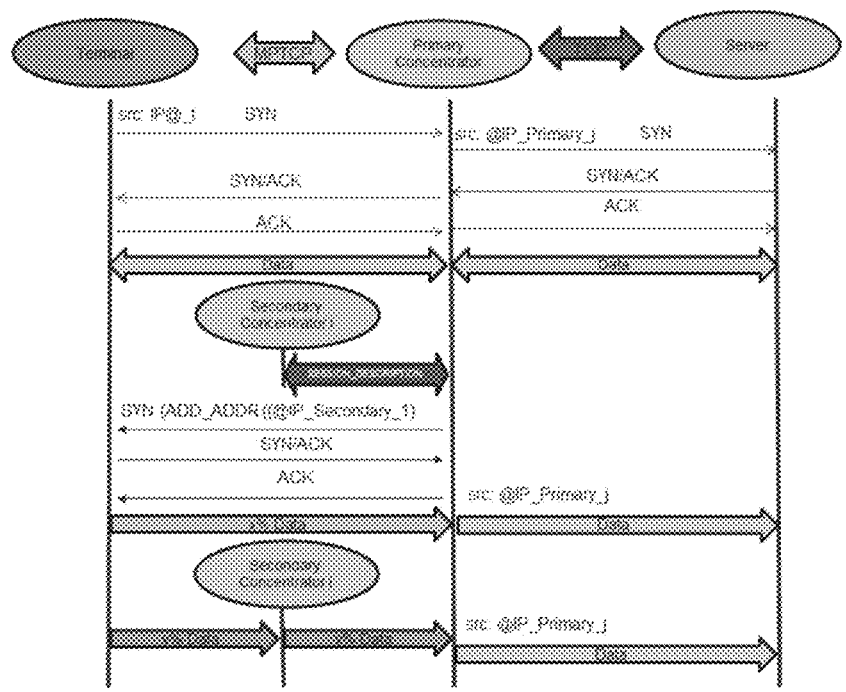
FIG. 9 shows a message exchange sequence in a first variant, in which the packets sent by a terminal and initially intercepted by a secondary concentrator are relayed to the primary concentrator.
Figure 10:
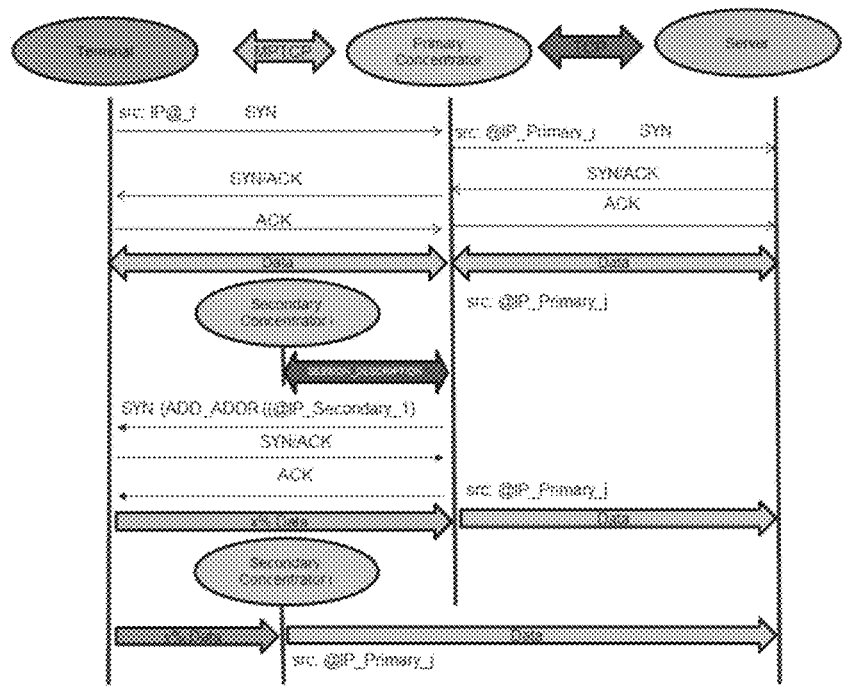
FIG. 10 shows a message exchange sequence in a second variant, in which the packets sent by a terminal and initially intercepted by a secondary concentrator are not relayed to the primary concentrator.

Whatever the variant, the terminal T can share outgoing traffic between the primary concentrator and the secondary concentrator(s) (as indicated by the percentages x % and y % in FIGS. 9 and 10). The traffic distribution policy may be local to the terminal, or it may be suggested by the primary concentrator, e.g. using a "RATIO" option as shown in FIG. 11: this "RATIO" option is used by a device to indicate a load sharing preference for a given path from among a plurality of paths. In FIG. 11, "Val_Sug" designates a suggested load sharing value, and "Address_Id" specifies an identifier of the address of the interface of the associated terminal T.

Traffic with a User Equipment Destination

The provisions described above ensure that the packets received by the server S from the terminal T all present the same source address (said external address), i.e. the address of the primary concentrator associated with the connection. Consequently, when the server S responds by sending data packets over the connection, it uses that external address as the destination address for the packets.

The primary concentrator knows how the various paths are used. The primary concentrator is preferably also responsible for distributing traffic over the various paths (i.e. spreading traffic over the various secondary concentrators involved in said connection).

In a first variant, the packets sent by the server S are initially intercepted by the primary concentrator.

The primary concentrator can decide to send some or all of the traffic via other secondary concentrators. For this purpose, the primary concentrator applies a traffic distribution policy among the various available paths.

If the packet is to be transmitted directly to the terminal T via one of the multiple paths being managed by the primary concentrator, the primary concentrator transforms the connection into an MPTCP connection; more particularly, it replaces the destination address and the destination port number with the address of the terminal T (this information being conserved in the connection table). Thereafter it sends the packet as modified in this way to the user equipment.

If the packet needs to be sent via some other path, managed by a secondary concentrator, the primary concentrator replaces the address and the port number of the destination of the packet with the address of the secondary concentrator, and it also inserts the "EndPoint" option together with the "Flag" attribute given the value "Destination". Thereafter, the packet as modified in this way is sent to said secondary concentrator. When the secondary concentrator receives this packet, it replaces the destination address by the address contained in the "EndPoint" option, and then transmits the packet over the next hop. The packet will then be received by the terminal T.

By way of example, FIG. 12 shows a message exchange sequence in the context of this first variant; this figure shows in particular how a traffic load sharing policy is implemented. It should be observed that the chronology given for the exchanges in this figure is given merely for illustrative purposes, and it is possible for the chronology of events to be different.

In a second variant, the packets sent by the server S are intercepted by a secondary concentrator; this is possible if the routing tables contain a path enabling the external address to be reached on passing via this secondary concentrator. Under such circumstances, the secondary concentrator, on receiving a packet, may:

transmit the packet directly to the terminal T, after replacing the destination address and the destination port number with the address of the terminal T (which information is conserved in the connection table); or redirect some or all of the traffic to the primary concentrator; or indeed redirect some or all of the traffic to other secondary concentrators in order to increase the bandwidth made available to the terminal T.

By way of example, the load sharing policy may be configured locally on each concentrator and may be applied using information that is available locally or as a function of information returned by the user equipments, or by at least one other concentrator (in particular the primary concentrator).

Figure 13:
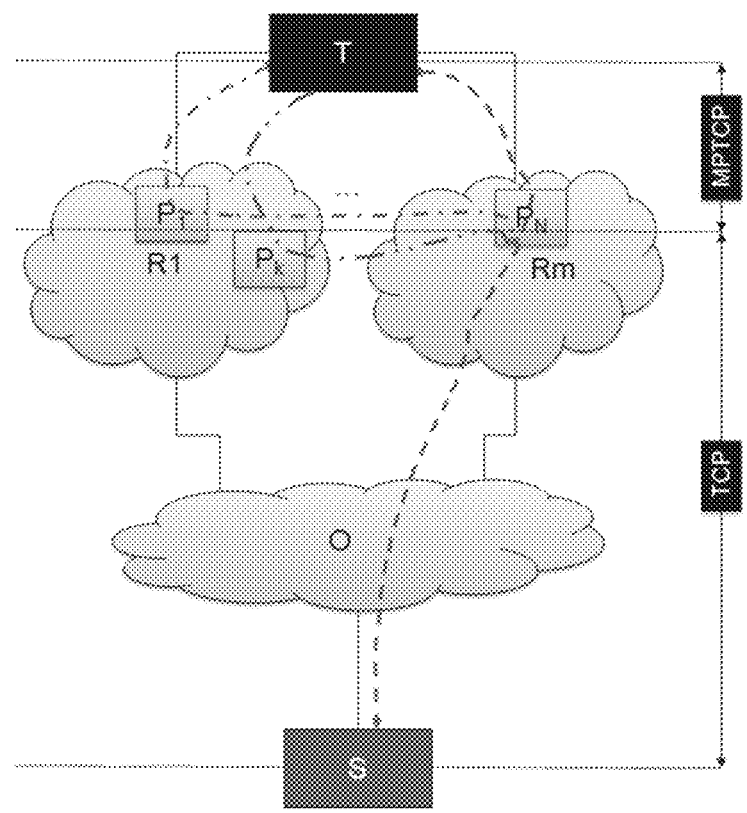
FIG. 13 shows a communication between a terminal T that is compatible with MPTCP and a server S that is compatible with TCP but not with MPTCP, in an embodiment of the embodiment.

In conclusion, the performance of the present implementation of the invention is shown in FIG. 13. In FIG. 13, $P_N$ is the primary concentrator whereas $P_1$ and $P_k$ are secondary concentrators for this connection. By means of the invention, the terminal T, which is compatible with MPTCP, can communicate with the server S, which is compatible with TCP but not with MPTCP; by way of example, the terminal T can thus benefit from greater download and upload data rates.

The invention can be performed within nodes of communications networks, e.g. network connection concentrators, by using software and/or hardware components. The concentrator function may be hosted in a datacenter or it may be located in a piece of equipment in the transport network. The function of the concentrator may also be a virtual instance.

Said software components may be incorporated in a conventional computer program for managing a network node. That is why, as mentioned above, the present invention also provides a computer system. The computer system comprises in conventional manner a central processor unit using signals to control a memory, together with an input unit and an output unit. Furthermore, the computer system may be used to execute a computer program including instructions for implementing any of the methods of emulating a multipath connection of the invention.

Specifically, the invention also provides a computer program as described briefly above. The computer program may be stored on a computer readable medium and may be suitable for execution by a microprocessor. The program may use any programming language, and may be in the form of source code, object code, or code intermediate between source code and object code, such as in a partially compiled form, or in any other desirable form.

The invention also provides a non-removable or partially or completely removable data medium including instructions of a computer program as described briefly above.

The data medium may be any entity or device capable of storing the program. For example, the data medium may comprise storage means such as a read only memory (ROM), e.g. a compact disk (CD) ROM or a microelectronic circuit ROM, or magnetic recording means such as a hard disk, or indeed a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from a network such as the Internet.

In a variant, the data medium may be an integrated circuit in which the program is incorporated, the circuit being adapted to execute or to be used in the execution of any of the methods of emulating a multipath connection of the invention.

Although the present disclosure has been described with reference to one or more examples, workers skilled in the art will recognize that changes may be made in form and detail without departing from the scope of the disclosure and/or the appended claims.

The invention claimed is:

1. A method of emulating a multipath connection, in which data packets sent or received by a given user equipment are processed by a plurality of concentrators situated in at least one network to which said user equipment is connected, each concentrator serving to aggregate connections making use of a plurality of paths that can be used by the user equipment, the method comprising:

designating one of the concentrators in a dynamic manner as being a "primary" concentrator and the other concentrator(s) as being a "secondary" concentrator(s), and wherein said primary concentrator or a secondary concentrator performs acts comprising:

a) receiving a data packet sent by the user equipment to a correspondent;

b) when the user equipment is compatible with multipath connections and said correspondent is not compatible with multipath connections, removing all multipath options from the received packet;

c) replacing a source address of the received packet with an address of the primary concentrator; and d) sending the packet as modified in this way to said correspondent.

2. The method of emulating a multipath connection according to claim 1, wherein:

said packet sent by the user equipment is intercepted by a secondary concentrator;

said secondary concentrator implements the following acts:

inserting into the packet an option mentioning said source address of the packet together with an option mentioning a destination address of the packet;

replacing the source address of the packet with an address of the secondary concentrator;

replacing the destination address of the packet with an address of said primary concentrator; and sending the packet as modified in this way to the primary concentrator; and said acts a), b), c), and d) are subsequently implemented by the primary concentrator.

3. The method of emulating a multipath connection according to claim 1, wherein after said correspondent has sent a data packet destined for said user equipment:

a') said packet is intercepted by said primary concentrator, or by a secondary concentrator situated on a path followed by the packet and terminating at said address of the primary concentrator;

b') when the correspondent is not compatible with multipath connections and the user equipment is compatible with multipath connections, the primary concentrator or a secondary concentrator inserts multiple path options into the packet; and c') the primary concentrator or a secondary concentrator replaces the destination address of the packet with an address of the user equipment, and sends the packet as modified in this way to the user equipment.

4. The method of emulating a multipath connection according to claim 3, wherein act c') comprises the following subacts:

said primary concentrator replaces the destination address of the packet with the address of a secondary concentrator, inserts into the packet an option mentioning the address of said user equipment, and sends the packet as modified in this way to said secondary concentrator;

the secondary concentrator replaces the destination address of the packet by the address of the user equipment mentioned in said option; and the secondary concentrator sends the packet as modified in this way to the user equipment.

5. The method of emulating a multipath connection according to claim 1, wherein, after said user equipment has initialized a multipath connection and sent a first data packet over that connection, one concentrator of said plurality of concentrators is designated as the "primary" concentrator when said packet is initially intercepted by said concentrator.

6. The method of emulating a multipath connection according to claim 1, wherein a concentrator of said plurality of concentrators is designated as the "primary" concentrator or as a "secondary" concentrator as a function of a destination address of said received packet.

7. The method of emulating a multipath connection according to claim 1, wherein a concentrator of said plurality of concentrators is designated as the "primary" interface or as a "secondary" concentrator as a function of availability of a route from that concentrator for reaching said correspondent.

8. The method of emulating a multipath connection according to claim 1, wherein a concentrator of said plurality of concentrators is designated as the "primary" concentrator or as a "secondary" concentrator as a function of a quality of service offered by the concentrator for reaching said correspondent.

9. A primary concentrator situated in a network to which a given user equipment is connected, the primary concentrator comprising:

a processor; and a non-transitory computer-readable medium comprising instructions stored thereon, which when executed by the processor configure the primary concentrator to process data packets sent or received by said user equipment and aggregate connections using a plurality of paths that can be used by the user equipment, wherein processing comprises:

intercepting a data packet sent by the user equipment to a correspondent;

when the user equipment is compatible with multipath connections and said correspondent is not compatible with multipath connections, removing from the packet all multipath options;

replacing a source address of the packet with an address of the primary concentrator; and sending the packet as modified in this way to said correspondent.

10. The primary concentrator according to claim 9, wherein the instructions further configure the primary concentrator to:

intercept a data packet sent by said correspondent and destined for said user equipment;

when said correspondent is not compatible with multipath connections and said user equipment is compatible with multipath connections, insert multipath options in said packet;

replace a destination address of the packet with an address of the user equipment, and send the packet as modified in this way to the user equipment, and/or replace the destination address of the packet with an address of another concentrator, referred to as a "secondary" concentrator, insert in the packet an option mentioning the address of the user equipment, and send the packet as modified in this way to said secondary concentrator.

11. A secondary concentrator situated in a network to which a given user equipment is connected, the secondary concentrator comprising:

a processor; and a non-transitory computer-readable medium comprising instructions stored thereon, which when executed by the processor configure the secondary concentrator to process data packets sent or received by said user equipment and aggregate connections using a plurality of paths that can be used by the user equipment, and to perform the following acts that are triggered as a result of said secondary concentrator intercepting a data packet sent by the user equipment and destined for a correspondent:

removing from the packet, when the user equipment is compatible with multipath connections and said correspondent is not compatible with multipath connections, all multipath options, replacing a source address of the packet with an address of another concentrator, referred to as a "primary" concentrator, and sending the packet as modified in this way to said correspondent; and/or inserting in the packet an option mentioning said source address of the packet together with an option mentioning a destination address of the packet, replacing the source address of the packet with an address of said secondary concentrator, replacing the destination address of the packet with an address of said primary concentrator, and sending the packet as modified in this way to the primary concentrator.

12. The secondary concentrator according to claim 11, wherein the instructions further configure the secondary concentrator to:

receive a data packet from a primary concentrator, or respectively from said correspondent;

replace the destination address of the received packet with the address of the user equipment mentioned in an option contained in the received packet, or respectively mentioned in a connection table accessible to said secondary concentrator; and send the packet as modified in this way to said user equipment.

13. A non-transitory computer-readable medium comprising computer program code instructions stored thereon for executing a method of emulating a multipath connection when the instructions are executed on a processor of a primary concentrator or of a secondary concentrator, wherein in the method of emulating a multipath connection, data packets sent or received by a given user equipment are processed by a plurality of concentrators situated in at least one network to which said user equipment is connected, each concentrator serving to aggregate connections making use of a plurality of paths that can be used by the user equipment, and wherein one of the concentrators is designated in a dynamic manner as being the "primary" concentrator and the other concentrator(s) as being a "secondary" concentrator(s), the instructions configuring the primary concentrator or a secondary concentrator to perform acts comprising:
- a) receiving a data packet sent by the user equipment to a correspondent;
- b) when the user equipment is compatible with multipath connections and said correspondent is not compatible with multipath connections, removing all multipath options from the received packet;
- c) replacing a source address of the received packet with an address of the primary concentrator; and
- d) sending the packet as modified in this way to said correspondent.

* * * * *